United States Patent [19]

Garmong

[11] 4,072,929
[45] Feb. 7, 1978

[54] COMPUTER CONTROLLED BULK STORAGE FLUID DISPENSING TERMINAL

[75] Inventor: Victor H. Garmong, Kennerdell, Pa.
[73] Assignee: George Edwin Wolfe, Kennerdell, Pa.
[21] Appl. No.: 660,361
[22] Filed: Feb. 23, 1976
[51] Int. Cl.² ............................................. H04Q 5/00
[52] U.S. Cl. ............................. 340/147 A; 340/149 A
[58] Field of Search ...................... 340/147 A, 149 A; 235/61.7 B

[56] References Cited

U.S. PATENT DOCUMENTS

| | | | |
|---|---|---|---|
| 3,030,015 | 4/1962 | Wieslander | 340/147 A |
| 3,701,100 | 10/1972 | Yarbrough | 235/61.7 B |
| 3,786,421 | 1/1974 | Wostl | 340/147 A |
| 3,829,661 | 8/1974 | Silverman | 235/61.7 B |
| 3,931,497 | 1/1976 | Gentile | 340/149 A |

*Primary Examiner*—Harold I. Pitts
*Attorney, Agent, or Firm*—Carothers and Carothers

[57] ABSTRACT

A computer controlled bulk storage fluid dispensing terminal for dispensing fluid, such as flammable fuels, to customer vehicles from a plurality of adjacent loading stations without the requirement of a full time attendant. A multiple digit input data entry terminal is positioned at each of the stations and is electrically connected to a central computer for coded customer identification data entry into the computer by hand manipulation by the driver of the multiple digit input. When the customer has been recognized by the computer as authorized, an indication is given that he may proceed to fill the vehicle. The computer regulates the allocation of quantity and type of fluid to be dispensed to the particular customer, monitoring the entire dispensing operation. The computer prints out fluid dispensing information on a teletype or any other type of line printer. The computer is confined within a secured area and provided with a coded multiple digit input limited access whereby the data with which the computer program works may be changed, but the program itself will not be altered by attendants unskilled in the computer arts. The entire fluid dispensing terminal may also be surrounded by a security fence having a gate access. A multiple digit input data entry terminal is provided at the gate whereby the driver, by hand selection of the multiple digit input, can enter a coded identification for recognition by the computer and subsequent access through the gate.

7 Claims, 6 Drawing Figures

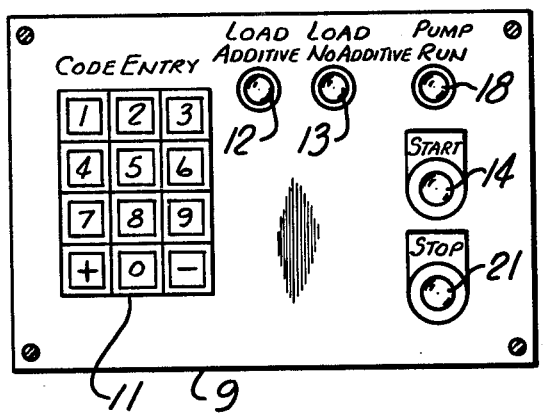
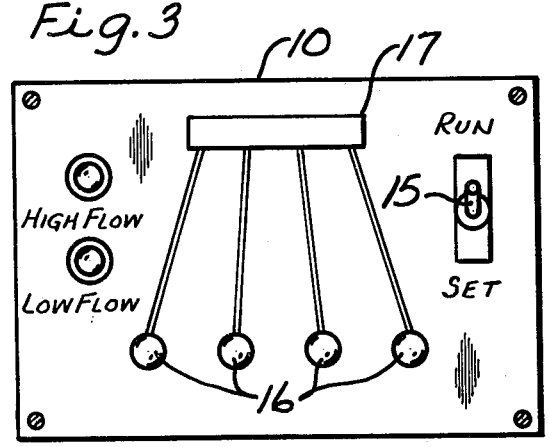
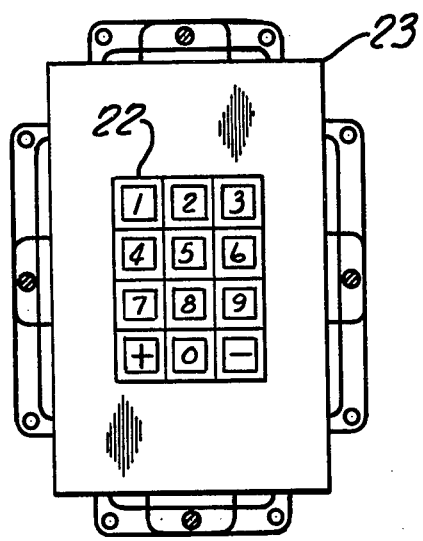
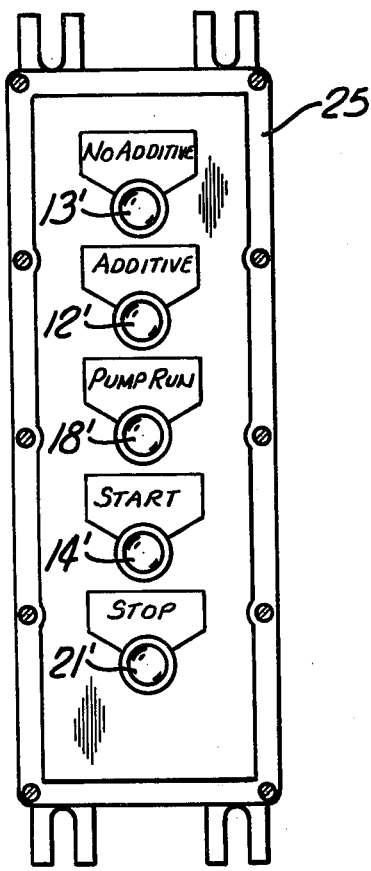
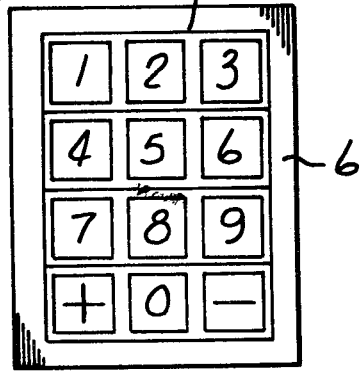

COMPUTER CONTROLLED BULK STORAGE FLUID DISPENSING TERMINAL

BACKGROUND OF THE INVENTION

1. Field of the Invention

This invention relates generally to fluid dispensing and more particularly to the automatic dispensing of bulk stored fluids at a dispensing terminal to different customers by computer control.

2. Discussion of the Prior Art

To date, a number of systems have been proposed and used for the automatic loading of trucks with liquid fuel from a bulk storage installation for subsequent wholesale distribution to customers. The more sophisticated of these installations utilize process control computers which do all the checking, loading and record keeping. The only main task which the truck driver has to perform is the connection and disconnection of hoses and sniffer vacuum lines for top loading vehicle tanks. He may also be required to raise and lower loading platforms for top loading type vehicles. However, most tank type trucks now utilized for the hauling of flammable liquids are changing over to the bottom load type, wherein the hose fill connections are made at the under side or bottom of the tank as opposed to the top. The bottom fill type tank trucks are preferable in the industry, because of easier access and mainly because of the safety feature which it provides in that there are fewer vapor recovery problems or hazards in bottom loading, as the vapor is confined within the truck tank.

In these dispensing systems, the computer safeguards the entire operation by checking on the validity of the driver's request for a load, indicating what products may be selected for that customer, and preventing loading until procedural and safety requirements are met, such as the proper connection of safety ground wires and hose connections.

A data center is provided at each terminal and houses the computer together with a teletype. The teletype is generally used to program a computer and to receive output information, thereby providing a record on paper of fluid dispensing operations. A console is also located at each loading position to receive the driver's request and a teletype may also be provided at the consoles for the loading positions to type the bills of lading.

The truck driver receives a small punched card to identify himself, the company for which he drives, and the terminal to the computer. A separate card is issued for each terminal at which he may load, and cards are not interchangeable between terminals.

However, the system is such that if one trucking company owns, for example, 30 trucks and serves 50 different customers, then a separate card must be provided to identify each independent driver, an additional separate card must also be provided to identify each individual truck owned by the company, and further, an additional card must be provided to identify each individual customer to which the load is being shipped. It thus can be seen that such a system becomes extremely cumbersome, burdensome and inflexible.

In addition, the computer which is housed within a secured area at the terminal is set up such that only an expert or one educated in computer programming can change the data with which the computer program works without the hazard of undesirably affecting or changing the computer program itself. It can be readily seen that a great amount of data may have to be changed from time to time, such as the date, time, customer, driver, truck, security code, customer status, and customer allocation, including the number of gallons and type of product and additives permitted to that particular customer. It is obvious that each time the driver, truck or customer identification, etc., changes, a new card must be made up and issued, and the computer programmed by one knowledgeable in computer programming.

Also, the systems of the prior art do not provide for adequate security with flexibility for information change for initial access to the entire terminal system.

It is the principal object of the present invention to eliminate the foregoing disadvantages of the automatic truck loading terminals of the prior art.

SUMMARY OF THE INVENTION

The computer controlled bulk storage fluid dispensing terminal of the present invention comprises at least one vehicle fluid loading station (usually a plurality) which is controlled by an electronic computer that is housed within a secured area and has a memory bank which is programmed to permit dispensing of allocated types and quantities of fluid to authorized customers. A multiple digit input data entry terminal is positioned at each of the loading stations, and is electrically connected to the computer for coded customer identification data entry by hand manipulation of the multiple digit input by the truck driver.

An indication means is electrically connected to the computer to indicate to the operator or truck driver upon command from the computer that he has been recognized by the computer as an authorized customer and is then permitted to proceed to fill his vehicle with an allocated quantity and type of fluid at the selected station. Means are provided at each station and also electrically connected to the computer to pump the selected quantity of the allocated fluid from the bulk storage into the vehicle at the selected station only after the indication means indicates valid customer and/or driver, and/or truck recognition by the computer. A teletype or printout means is connected to the computer to automatically print out fluid dispensing information after completion of the dispensing operation for office records and/or bills of lading. The truck driver thus merely has to enter his customer identification information by manipulating the multiple digit input of the data entry terminal which may, for example, be in the form of a multiple key touch pad. For example, the identification code number might contain eight digits, the first three of which identify the driver, the second two of which identify the truck, and the last three digits of which identify the customer. As an alternative, the identification code number may contain seven digits, wherein the first two digits represent the driver, the second two digits represents the truck and the last three digits represent the customer. As most everyone is familiar with seven-digit telephone numbers, it is easier for the driver to remember and punch in or dial the code.

One driver may drive a number of different trucks, and he may service a plurality of different customers with different trucks. In this situation, the first three digits identifying the driver would remain the same upon each visit to the terminal for loading, but the two middle digits would vary with the particular truck he is loading and the last three digits would vary depending upon what customer is being served.

The data entry terminal also serves as a very useful tool for the driver, although uneducated in the computer programming art, to communicate with the computer under special conditions. By entering a special function code number into the data entry terminal, the driver may correct a previous computer entry to note, for example, a correction in delivery of fluid quantity to a particular customer.

The entire dispensing terminal is preferably surrounded with a security fence having a gate to permit passage of vehicles for loading and departure. A multiple digit input security code gate entrance device is positioned at the gate and also electrically connected to the computer. The gate entry device has a hand selection multiple digit input for entry of a multiple digit customer validity code into the computer for recognition. If the proper code is entered, the computer will recognize the driver and either permit him to open the gate, or open and close the gate by other automatic means.

The computer continually monitors all code numbers entered into the data entry terminal at the loading station, and upon command by authorized personnel, all entries made into the data entry terminal by all drivers will be printed out whether or not they are correct or valid code numbers, thereby providing the terminal personnel with a means to verify whether a driver is improperly attempting to obtain or use another driver's number. If the same driver attempts to use one of his two permitted tries in an attempt to improperly find another driver's number, it will record the incorrect number as well as the correct number which he subsequently enters thereby identifying the person attempting to break the code.

A set stop is positioned at each loading station and is connected to the computer for selection of the desired fluid quantity of the amount allocated to the identified customer. After the driver has been identified as authorized by the computer, he may thus set the set stop to the desired quantity and start the pumping operation which is monitored by the computer. The computer will not permit him to exceed the allocated amount which has been previously designated to the computer.

Another novel feature of the set stop is that it is equipped with a high and low flow capability in order to save wear on valves and associated equipment when the set stop is counting down the quantity of fuel being loaded. Upon reaching a predetermined minimum quantity of fuel remaining to be pumped into the vehicle, the set stop switches the fluid flow from high flow to low flow (from, for example, 1,200 gallons per minute to 400 gallons per minute), so that when the valve shuts off, the shock to the valves and piping system is not so great. The set stop is also capable of being adjusted for error in excessive fluid flow due to valve wear so that the set stop may be preadjusted to shut off sooner than the fluid dispensing countdown indicates in order to maintain flow of only the exact amount of fluid selected.

The set stop is used in conjunction with the bottom loading of vehicles. For top loading, an extra security code device is provided together with a second indication means which indicates to the driver that he has been identified by the computer as an authorized customer and that he may proceed to fill his vehicle. However, with top load vehicles, the pumping of the fluid into the vehicle is directly controlled manually by the driver, and the operation is again controlled by the computer as to the particular customer's quantity allocation.

The pump means includes a flow monitor which is connected to the computer in order to monitor the quantity of fluid being pumped to the vehicle so that the computer may monitor and control the filling operation.

A command control is also housed within the secured area with the computer and is electrically connected to the computer for coded data entry to bring a simple question and answer programming routine into play for the unskilled attendant to work out on the teletype. The command control includes a hand manipulated multiple digit input which is capable of permitting one to change the data with which the program of the computer works, but is incapable of changing the program itself, thereby permitting an unskilled mechanic to readily change customer information such as driver change or allocation of quantities and types of fluids permitted to be dispensed to that particular customer without endangering interference with the basic computer program itself.

A computer bypass switch is also preferably housed in the secured area with the computer whereby the computer may be manually switched on or off for control of the terminal so that the terminal may be manually controlled if required or desired by the proper terminal personnel.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 2 is a front view of the data entry terminal utilized in the system of the present invention for coded identification data entry into the computer.

FIG. 3 is a front view of a set stop utilized to hand select the desired quantity of fluid to be dispensed for bottom load vehicles.

FIG. 4 is a front view of a data entry terminal for top loading vehicles with the system of the present invention at hazardous locations.

FIG. 5 is a front view of a pump start control for dispensing fluid with the system of the present invention for top loading vehicles at a harzardous location.

FIG. 6 is a front view of a command control utilized in the system of the present invention for changing the data with which the program of the computer in the system of the present invention will work.

DETAILED DESCRIPTION OF THE DRAWINGS

Figure 1:
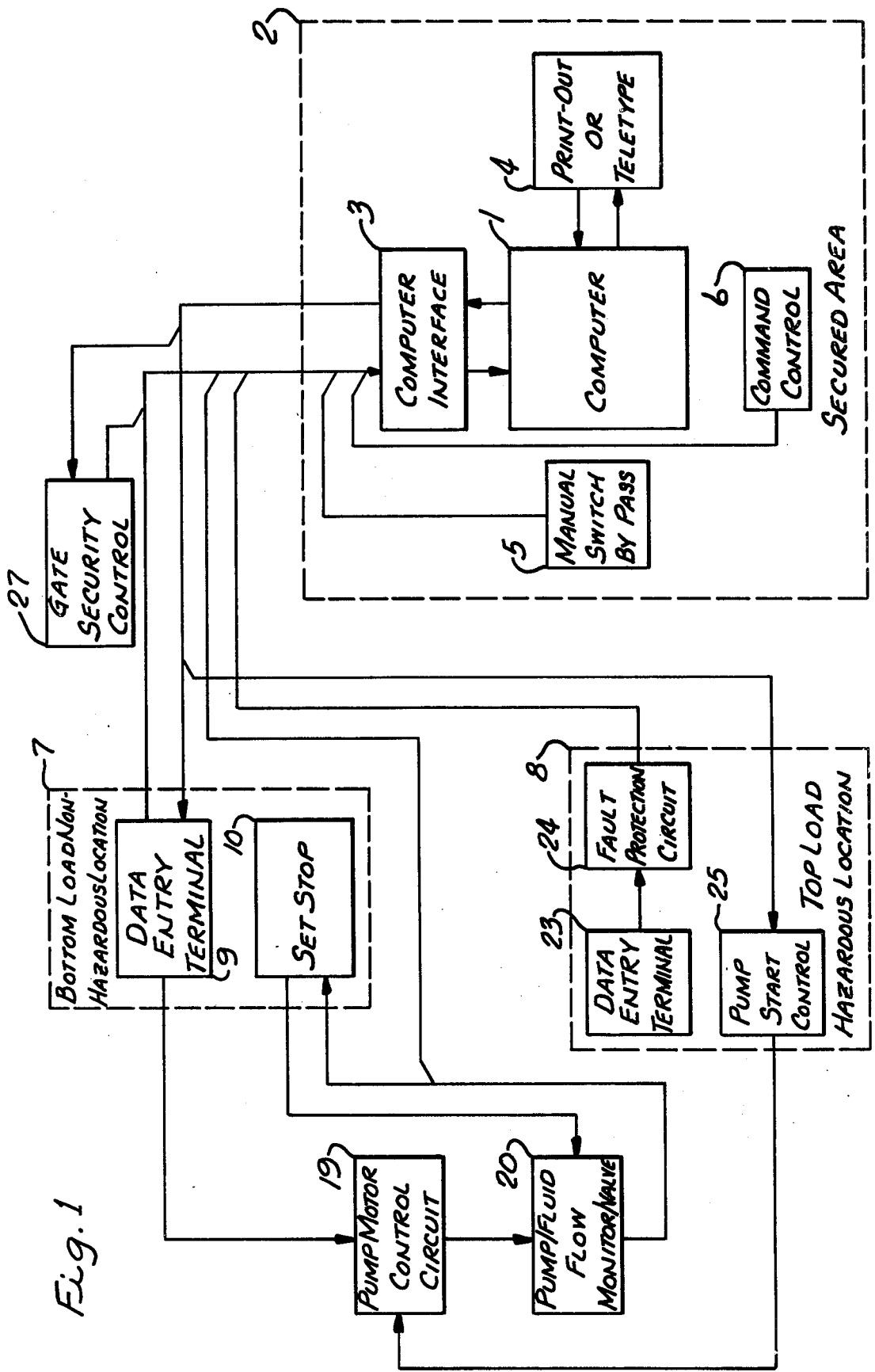
FIG. 1 is a system block diagram illustrating the computer controlled bulk storage fluid dispensing terminal of the present invention.

Referring to FIG. 1, the computer controlled bulk storage fluid dispensing terminal of the present invention is represented in block diagram form. The computer which basically controls the entire fluid dispensing operation is designated as numeral 1. As an example, the computer 1 might have 12,000 words of dynamic memory thereby allowing it to be programmed in assembler, basic, or any of the higher level programming languages. Such computers are readily available on the market and are easily expandable from the basic console configuration to 64,000 words, if required.

The computer 1 is housed within a secured area 2, which would typically be an office building on the premises of the terminal which permits access to the computer only by authorized terminal personnel.

Computer interface 3 is also basically conventional in design and provides proper interface connection between the computer and the remainder of the system. The computer interface 3 is also housed within the secured area 2.

The printout device or teletype 4, which is also housed within the secured area 2, is utilized to program the computer and receive output information.

The manual bypass switch 5 is illustrated separately in the diagram within the secured area 2, but this switch or switches may, of course, be an integral part of the computer interface, for example. Manual bypass switch 5 may consist of one, and usually a plurality, of manual switches which may be turned on or off to bypass the function of the computer and permit the loading station where the fluid is to be pumped into the vehicle to be operated manually without computer control. Normally, there would be a manual bypass switch for each independent vehicle fluid loading station within the terminal so that the computer control for any one station may be bypassed by authorized terminal personnel in the case of an electrical or mechanical failure within the system.

The last element illustrated within the secured area 2 is the command control 6 which permits authorized terminal personnel who are unskilled in the computer arts to change the data with which the program of computer 1 would work, without incurring the hazard of having the unskilled personnel unwittingly alter the computer program itself. The operation of the command control 6 will be discussed in greater detail hereinafter.

At each bulk storage fluid dispensing terminal, such as for the dispensing of flammable fuels to tank trucks, there are generally a plurality of loading positions which the truck driver can select to pull his truck up alongside for filling. Different loading positions may also be discharge stations for different types or grades of fuel. For the purpose of illustration, it will be assumed that for an existing terminal there are seven separate loading positions which are normally positioned adjacent or side-by-side so that the truck driver may pick his appropriate stall or position for loading.

At each separate loading position, there will be facilities for filling bottom load vehicles and also facilities for filling top load vehicles. Referring to FIG. 1, the controls operated by the truck driver to operate the bottom load facilities are designated as contained within the boundries of dashed line 7 and the controls which must be operated by the driver for top load vehicles are confined within the dashed area designated at 8.

The bottom load facility controls 7 do not have to be positioned directly next to the point at which the vehicle is filled, as the filling operation is automatic. Accordingly, the controls 7 for bottom loading are positioned at least 10 feet from the point of loading and therefore this area 7 is designated as a non-hazardous location for the loading of flammable fuels. Generally the fluid filling facilities at each station are mounted on a concrete island somewhat similar to that which might be found at an ordinary gasoline station or service station. In this situation, the bottom load controls 7 are usually mounted at one end of the island so that they are 10 feet or more from the actual point of loading. They may also be located at the load point if the proper safety requirements are observed.

However, with the older type top loading vehicles, it is necessary for the truck driver himself to manually oversee the fuel pumping operation, and accordingly, the truck driver is usually positioned over top of the truck tank at the point of filling. Therefore, his controls 8 which he must operate in order to carry out the filling operation must be positioned adjacent the point of filling, and with flammable fuels, top load location 8 is designated as hazardous.

The bottom load controls positioned at non-hazardous location 7 consist of data entry terminal 9 and set stop 10. A detailed view of the front panel of security code data entry device or terminal 9 may be seen in FIG. 2, and a detailed front view of the panel of set stop 10 may be seen in FIG. 3. Both of these devices are usually housed within a booth at the end of each loading station.

As previously mentioned with prior art systems, it was necessary for each driver to have a punched card for insertion into a data entry device for recognition by the computer. In addition, each different truck and each different customer would have to have a separate punched coded card for identification by the computer. However, with the system of the present invention, this requirement is completely eliminated and all data entry to the computer is made by the truck driver by the use of a multiple digit input data entry terminal which is hand manipulated for entry of coded customer identification data into the computer for recognition. Referring specifically to FIG. 2, this multiple digit input is illustrated in the form of a 12-position touch pad which will accept a number and transfer it into a binary code to be recognized by computer 1. This 12-position touch pad is designated as numeral 11. It is laid out in the same conventional manner that a telephone touch pad is laid out so that the driver will be more readily familiar with the device.

Data entry terminal 9 consists basically of nothing more than a multiple key touch pad made up of normally open switches, a nine line to four line encoder in order to convert the binary coded decimal input from the touch pad to a binary four-digit code for the computer, light indications controlled by the computer to indicate running conditions of the system, and pump start and stop buttons or switches 14 and 21. The light indications 12, 13 and 18 indicate whether there are additives or no additives in the fluid being supplied and also indicate whether the system is actually under operation and the pump is running. The computer has final control over these functions and none of these conditions can be carried out, nor will the lamps indicate any of these conditions, until the computer issues the proper signal to operate the corresponding or proper relay to electrically control the particular function and also illuminate the respective lamp 12, 13 or 18. This is accomplished by relays housed in the data entry terminal 9 which are operated by signals from the computer. In this manner, the computer has direct control over the pump motor control circuit 19 via the data entry terminal 9.

Ten of the keys of touch pad 11 are numbered consecutively as 1 through 9 and 0. The bottom left-hand key is designated "+" and the bottom right-hand key is designated "−". The keys designated "+" and "−"

may be utilized to function other than as code entry numbers. For example, the "+" key would normally be utilized as a clear key, to make certain the system is clear before the driver begins to punch in his code number for identification, or if he inadvertently enters the wrong number he can push the clear or "+" key, thereby clearing the system so that he may reenter the correct number code. The remaining "−" key may be used for any other special function which may be required.

The truck driver would thus first select the proper terminal station to pull his truck up alongside. He will normally select the station according to the type of fuel which the particular customer he is shipping it to requires. This is already preprogrammed into the computer 1 so that allocation of fuel quantities and types for a particular customer are controlled by the computer.

Customer allocation may be accomplished in various ways. The computer may be programmed such that if the allocation is exceeded, the flow valve is closed and that customer may not receive any additional fuel or fluid until it is approved by terminal personnel and the allocation quantity stored within the computer is changed. Another manner in which allocation may be regulated is if a customer has, for example, 2,000 gallons left on his particular allocation allotment and he orders 4,000 gallons not knowing that this would exceed his particular allocation, he may be permitted by the computer to complete that load and then will be locked out thereafter. This 2,000 gallon excess over his allocation may, if desired, be subtracted from his next month's allocation.

Once the driver has his truck in position (for the purpose of this example it is assumed to be a bottom load tank truck), he then attaches the hose connection to the bottom of his tank and also connects a ground lead to the truck chassis to provide proper grounding. These two hookup functions are also monitored by the computer by proper electrical connections to the computer, and the driver may not initiate the fluid dispensing operation until the proper connections are made, as the computer 1 will not otherwise recognize the customer. This particular safety feature with respect to the proper hookup is well known in the prior art, and is incorporated in all prior art computer controlled fluid dispensing systems.

The driver is issued a customer identification number. Practically, this may be a seven-digit number, as all people are accustomed to telephone numbers and use them frequently. In addition, a seven- or more-digit number greatly reduces the possibility of randomly or purposely selecting another customer's number and also increases the amount of customer numbers which can be issued.

The seven-digit coded customer identification number identifies the driver, the truck and the customer. For example, the first two digits of the seven-digit number would identify the driver, the second two digits would identify the truck to be loaded, and the last three digits would identify the customer to which the fuel load is being delivered.

The product status of the particular customer identified is already preprogrammed into the computer. Thus, by identifying the customer with the last three digits of the code, the computer 1 automatically verifies that the driver selected the proper product. The computer also recognizes that the driver and truck are also properly identified and authorized to load for that particular customer.

The driver must enter the correct code number into the touch pad 11 within two tries, or he will be locked out by the computer for five minutes. This is done in order to prohibit improper personnel from obtaining another number to load by through trial and error.

Once the driver has selected a desired and proper load area or station and connects the ground line and truck fill line and has further entered the proper multiple digit identification code on touch pad 11, then the computer 1 will recognize him as an authorized customer and permit him to proceed to fill the vehicle up to a maximum of a preselected allocated quantity and type of fuel. Recognition is made through an indication means which in this instance is either the load additive lamp 12 or the load non-additive lamp 13, appearing on the front panel of security code data entry device 9.

The indication lamp 12 or 13 not only indicates to the driver that he may proceed to fill his vehicle, but in addition lets the driver know whether the fuel which he is loading contains additives or no additives as preselected and programmed into the computer for the particular customer.

When the load additive lamp 12 or load non-additive lamp 13 is lit, the driver will then turn to the set stop 10 as seen in FIG. 3 and make certain that switch 15 is in the set position, whereupon he will select the number of gallons which he desires to pump into the vehicle by the use of knobs 16. The four knobs 16 indicate gallons and represent ones, tens, hundreds, and thousands of gallons from right to left. The selected number of gallons then appears at the read out window 17, which is a light-emitting diode display. The driver will then change switch 15 from the set position to the run position.

Following this, he will then push pump start button 14 on the data entry terminal 9 and the pump run light 18 will come on indicating that the pump is operating and filling the vehicle tank with fluid.

The operation of pump start button 14 causes contacts within pump motor control circuit 19 of FIG. 1 to energize the pump. The contacts found within this pump motor control circuit are also connected directly to the computer so that the computer may shut down the pump if the quantity of fuel being pumped into the truck exceeds the allocation of the particular customer.

Block 20 represents the pump which is controlled by pump motor control circuit 19, a fluid flow monitor, and a fluid flow valve. The fluid flow monitor within block 20 monitors the quantity of fluid being pumped into the truck tank and sends out a pulse for each gallon of fluid which passes through the fluid flow monitor. As may be seen from FIG. 1, this pulse enters set stop 10 and also computer 1. Thus, computer 1 continually monitors the fluid flow and in addition, each pulse which enters set stop 10 causes the selected fluid quantity in window 17 to reduce by one gallon until zero is reached, at which point set stop 10 sends out a signal to block 20 to close the valve and stop further flow of fuel to the truck.

If, on the other hand, set stop 10 has been set such that the quantity of fluid selected exceeds the allocated quantity of fuel for that particular customer as stored in the computer memory, then computer 1 will shut down pump motor control circuit 19 and accordingly the pump in block 20 when the allocated quantity of fuel has been obtained.

Set stop 10 consists of nothing more than a solid state logic operated down counter. As it receives pulses from fluid flow monitor 20 (generally one pulse for each gallon flowing to the vehicle) it counts down from the preselected number of gallons initially indicated on the LED display 17 until zero gallons is obtained. At this point, the set stop shuts down the fluid flow valve, provided, of course, the computer has not already shut down pump motor control circuit 19 due to the fact that the particular customer has already exceeded his allocation quantity.

It will also be noted from FIG. 3 that set stop 10 is equipped with high and low flow indication lamps. The system permits the fluid being pumped to the vehicle to flow at a high rate (1,200 gallons per minute, for example) until a particular minimum number of gallons remains to be loaded in the vehicle. At this point, set stop 10 is adjusted such that it will switch to low flow and the rate of flow of fuel or fluid to the vehicle will be reduced to a much lower rate (400 gallons per minute, for example), so that when valve 20 shuts down when set stop 10 reaches zero gallons, the shock to the valve and piping system is greatly reduced thereby reducing wear and possible damage to the system.

Set stop 10 also is equipped with a simple means to adjust the point at which the set stop will shut down the pumping operation due to variation which may arise over a period of time from wear on valves. For example, the valves which regulate the flow of fluid to the vehicle tend to leak over a period of time due to wear and permit extra fluid flow therethrough even after shut down has been effected. In order to compensate for this, the set stop 10 may be readily adjusted to shut down the pumping operation before the countdown operation carried out in the set stop reaches zero. In other words, it may shut off valve 20 when the set stop reads down to one gallon instead of zero, by maintaining the actual fluid flow to the vehicle in exact correspondence with the actual quantity selected on the set stop 10. It is generally considered that one of ordinary skill in the electrical engineering art can readily design the set stop 10, or any of the other components described in FIG. 1, once he is given the conditions and requirements set forth in this specification.

Upon completion of the transaction, the driver turns off the pump by pushing pump stop button 21 which signals computer 1 to store the dispensing information and print it out on a teletype or other printout means 4 for terminal records and billing. It is further obvious that the teletype output may be connected to common telephone lines so that the information can be transferred to any remote bookkeeping or billing station for processing. Also, if desired, an additional teletype may be positioned in the vicinity of the vehicle loading area in order to provide the truck driver with a bill of lading which he may take with him.

Upon completion of the bottom load fluid dispensing operation, the driver disconnects the feed line and ground line to the truck and delivers the product to the customer. If the driver fails to shut the pump off by means of pump stop switch 21 on the security code data entry device 9, an adjustable time delay of 2 to 5 minutes operates to provide for automatic shut down.

If the truck trailer tank is a top load, the driver will utilize both the controls 8 at the top load hazardous location adjacent the top load connection to the vehicle. The procedure is basically the same as that for bottom load as previously described in connection with controls 7. However, controls 8, as previously mentioned, are mounted directly adjacent the point of connection to the truck, as the driver manually fills the truck. Data entry terminal 23 and pump start control 25 combined, are the same circuitry as data entry terminal 9. Pump start control 25 is separated merely so it may be housed in an explosion-proof case.

After the lines have been properly connected to the truck, the driver then enters the customer identification number on touch pad 22 of top load security code data entry device or terminal 23, reference being made to FIG. 1 and FIG. 4. FIG. 4 shows the front panel of the security code data entry device 23.

Although data entry terminal 23 is located in a hazardous location where the pumping of flammable fuels occurs, it is entirely a low voltage circuit, and does not therefore have to be enclosed in an explosion-proof case provided fault protection circuit 24 is imposed in the circuit between data entry device 23 and computer 1. Fault protection circuit 24 is merely provided to prevent any voltage or current faults occurring elsewhere in the circuit from reaching security code device 23. In other words, it isolates the security code device to prevent sparking in a hazardous area, and may generally consist of a resistive network having voltage regulation and current limiting elements.

Fault protection circuit 24 is enclosed in an explosion-proof case. However, it does not have to be mounted directly at the hazardous location, as it may be mounted more remotely, such as ten feet or more from the point of loading with the controls 7 for bottom loading.

With the bottom load controls 7, the pump start and stop switches are part and parcel of the security code device 9. However, with the top load controls 8, the pump start control 25 is separate from the security code device 23, as it must be enclosed in an explosion-proof case in view of the fact that it is in a hazardous location and has a 120 volt A.C. circuit. Pump start control 25 is illustrated in FIG. 5.

This control includes a no additive lamp 13', a load additive lamp 12', a pump run lamp 18', a pump start button 14', and a pump stop button 21'. Each of these lamps and buttons perform the same functions as those correspondingly indicated on the face of data entry terminal 9 for bottom loading as illustrated in FIG. 2.

The filling operation is exactly the same as that for bottom loading, except there is no set stop, as the driver manually operates the pumping operation to fill the truck with the desired number of gallons of fuel. Again, if the selected quantity of fuel which the driver is pumping into the vehicle exceeds the amount allocated to that particular customer and as programmed into the computer 1, then computer 1 will automatically shut down the pumping operation as previously described with the bottom loading situation when the amount selected on the set stop 10 exceeds the allocated quantity. The operation is otherwise identical to that for bottom loading, and when the dispensing operation is completed and the pump stop switch 21 is activated (or computer 1 automatically shuts down the operation), printout or teletype 4 will print out the ticket number, customer number, date, time, spot or loading station, product number, whether the fuel contained additives or no additives, the quantity of fuel and the truck and driver identification numbers.

To further explain the flexibility of the fluid dispensing system of the present invention, the utilization of the data entry termimals 9 and 23 in conjunction with the system computer provides a great number of communication possibilities between the driver and the computer which heretofore was either impossible or extremely impractical with the punch card data entry systems utilized in the fluid dispensing systems of the prior art.

The flexibility of the hand manipulated multiple digit input for the data entry terminal permits a wide variety of communication possibilities between the computer and the vehicle driver. The data entry touch pads 11 and 22 in data entry terminals 9 and 23 may be used not only for the purpose of identifying the driver, the truck and the particular customer. It also may be used for special communication where required with the computer by entering or punching in a special function number which is programmed into the computer. For example, assume a driver loads 5,000 gallons of fuel for a particular customer, say customer A and it is thus recorded by the printout means through the computer that customer A received 5,000 gallons. However, if the driver finds upon delivery that customer A only accepts 4,000 gallons and the driver then delivers the remaining 1,000 gallons to customer B, this change must be recorded in the computer for proper billing. Thus, when the driver returns to the terminal for a new load, he selects the proper load station and enters a special function number on the touch pad 11 or 22 which the computer recognizes by any suitable visual display or any other means such as a teletype or printout means at the station. The driver then enters customer A's number and subtracts 1,000 gallons and thereafter enters customer B's number and adds 1,000 gallons, thereby correcting and completing the delivery status. The driver would then clear the data entry terminal and initiate a new loading process by entering the proper code identifying himself, the truck he is presently loading and the new customer. The system of the present invention thus provides a manner in which any number of special operations may be performed by the driver, as he may communicate directly with the computer.

As can be readily understood, a good deal of the data with which the computer program works will have to be varied from time to time in order to change such variables as the time, date, customer, driver, truck, security code number, and the customer allocation as to product and amount. The system of the present invention provides a unique means of permitting an attendant unskilled in the computer programming art to change these variables in computer 1 without disturbing the program which is recorded in the memory core of the computer. The terminal personnel can easily do this by means of command control 6 contained within the secured area 2. A front view of the command control 6 is illustrated in FIG. 6 and consists of another multiple key input in the form of a 12-position touch pad 26 which may be the same as the previously described touch pad.

In order to change the data with which the main program of computer 1 will work, a number of multiple digit code numbers may be entered into touch pad 26 to produce a corresponding number of different routines whereby this data may be varied. For example, there might be 14 different routines which may be carried out in order to permit the terminal personnel to change any one of 14 different items of data.

As an example, one routine may be for entering the time, a second routine for the data, the next four routines may be provided for entering a new customer, driver, truck or security code number, and the following three routines might be provided for deleting a driver, truck or customer. The tenth routine may then be to change a customer number, the eleventh routine to change a customer status, and the twelfth routine to change the customer allocation. The thirteenth routine then might be provided to add gallons to the allocation and the last routine may be to subtract gallons from the allocation.

In order to work any one of these 14 routines to change the data with which the computer program will work, the terminal personnel will first of all select the proper coded number to bring the particular corresponding routine desired into function. Each routine will thus have a different coded call number, and each coded call number may, for example, consist of an eight-digit code number.

If the terminal personnel for example desires to enter a new customer into the computer, he would refer to a manual to find the proper routine and the corresponding eight-digit code number which he must enter to bring the particular routine into function. If the eight-digit code number is given as 33373917, he will merely enter this number into the computer by touch pad 26 of command control 6. Upon doing this, teletype 4 will immediately print out the command "ENTER CUSTOMER NUMBER." The operator will then respond to the command and punch in the three digit customer identification which might be, for example, 678, on the teletype 4. Having done this the teletype in response to the computer will automatically print out another line stating "ENTER CODE FOR PRODUCT STATUS" and then identify sequentially each different product available followed by the letters Y-N, indicating the question Yes or No. If the particular customer is to be permitted to obtain that particular product, then the personnel will type in the letter Y on the teletype, and if the customer is not permitted to obtain that particular product, the letter N for No will be printed in on the teletype. Upon answering each question, the computer will then type out the next available product on the teletype until each question has been answered. When the routine has been completed, the new data is entered into the computer memory as required. Thus, command control 6 permits one who is not skilled in the computer arts to readily change the data with which the computer is required to work, yet does not permit him to interfere with the computer program by mistake, thereby altering the basic program with which the computer works.

Other routines may be performed in the same manner such as through-put reports of the terminal operations. In this manner, a valuation of drivers, drivers' routes or any other accounting function which may be required for terminal bookkeeping and accounting may be performed. For example, in a through-put report, the proper code is entered into command control 6 and the same type question and answer routine is carried out by use of the printout means 4, and in this manner the terminal operator can obtain a complete printout, for example, of each different fuel dispensed and the quantity with respect to each separate customer.

Another feature of the fluid dispensing terminal of the present invention is the gate security control 27 illustrated in block form in FIG. 1. For added security a security fence is preferably installed so that it surrounds the entire terminal to prevent unauthorized access of vehicles into the terminal. A gate is thus provided in the fence to permit the passage of authorized vehicles. Gate security control 27 is provided adjacent the gate so that a driver outside of the terminal may operate it. The control 27 is also provided with a 12-position touch pad such as is already provided in command control 6. The truck driver upon approaching the terminal gate, then punches a security code number into the gate security control 27. This may be the same seven-digit identification number utilized at the loading station if desired. When the computer 1 recognizes the validity of the coded number, then appropriate gate entry means either permits the driver to open the gate, or the gate is automatically opened by motorized gate control to gain entry to the terminal. The gate is such that it may be reopened from the inside without computer code entry. This additional security assists in preventing unauthorized personnel from obtaining any of the products.

I claim:

1. A computer controlled bulk storage fluid dispensing terminal comprising at least one vehicle fluid loading station, an electronic computer housed within a secured area and having memory means programmed to permit dispensing of allocated types and quantities of fluid to authorized customers, multiple digit input data entry means positioned at each of said at least one loading station and connected to said computer for coded customer identification data entry by hand manipulation of the multiple digit input, indication means connected to said computer to indicate to the operator upon command from said computer that he has been recognized by said computer as an authorized customer and permit him to proceed to fill a vehicle with an allocated quantity and type of fluid at the selected station, means at each of said at least one station and connected to said computer to pump the selected quantity of the allocated amount and type of fluid from a bulk storage into a vehicle at the selected station only after said indication means indicates valid customer recognition by said computer, printout means connected to said computer to automatically print out fluid dispensing information after completion of the dispensing operation, and including command control means housed within said secured area and connected to said computer for data entry, said command control means including a hand manipulated multiple digit input for entry into said computer of a multiple digit code to bring into function a corresponding question and answer computer programming routine on said printout means to change the data with which the basic program of said computer works while preventing the capability of changing the basic program itself.

2. The fluid dispensing terminal of claim 1 including security fence means surrounding said at least one loading station, a gate in said fence means to permit passage of vehicles for loading and departure, multiple digit input security code gate entrance means positioned outside of said gate and connected to said computer, said gate entry means having a hand selection multiple digit input for entry of a multiple digit customer validity code into said computer for recognition, and means to permit said gate to be opened for vehicle entry after validity recognition by said computer.

3. The fluid dispensing terminal of claim 1 including set stop means positioned at each of said at least one loading station and connected to said computer for selection and loading control of the desired fluid quantity of the allocated amount and data entry thereof into the computer by hand selection on a multiple digit input on said set stop means.

4. The fluid dispensing terminal of claim 1 including computer bypass switch means housed in said secured area and electrically connected to said computer to manually switch the control of the terminal by said computer off and on as desired.

5. The fluid dispensing terminal of claim 1, said means to pump including a flow monitor connected to said computer which monitors the quantity of fluid being pumped to the vehicle and sends a corresponding signal to said computer and means to automatically stop the pumping operation when said computer determines the quantity allocation has been obtained.

6. The fluid dispensing terminal of claim 3 wherein said data entry means and set stop means regulate the dispensing of fluid through a vehicle bottom load hookup, second multiple digit input data entry means positioned at each of said at least one loading station and electrically connected to said computer for coded customer identification data entry by hand manipulation of the multiple digit input for regulation of fluid dispensing through a vehicle top load connection, second indication means electrically connected to said computer to indicate to the operator upon command from said computer that he has been recognized by said computer as an authorized customer and permit him to proceed to top fill a vehicle with an allocated quantity and type of fluid at the selected station, and second means at each of said at least one station electrically connected to said computer to pump a desired quantity of the allocated amount and type of fluid from a bulk storage into the top of a vehicle at the selected station only after said second indication means indicates valid customer recognition by said computer.

7. A computer controlled bulk storage fluid dispensing terminal comprising at least one vehicle fluid loading station, an electronic computer housed within a secured area and having memory means programmed to permit dispensing of allocated types and quantities of fluid to authorized customers, multiple digit input data entry means positioned at each of said at least one loading station and connected to said computer for coded customer identification data entry by hand manipulation of the multiple digit input, indication means connected to said computer to indicate to the operator upon command from said computer that he has been recognized by said computer as an authorized customer and permit him to proceed to fill a vehicle with an allocated quantity and type of fluid at the selected station, means at each of said at least one station and connected to said computer to pump the selected quantity of the allocated amount and type of fluid from a bulk storage into a vehicle at the selected station only after said indication means indicates valid customer recognition by said computer, printout means connected to said computer to automatically print out fluid dispensing information after completion of the dispensing operation, security fence means surrounding said at least one loading station, a gate in said fence means to permit passage of vehicles for loading and departure, multiple digit input security code gate entrance means positioned outside of said gate and connected to said computer, said gate entry means having a hand selection multiple digit input for entry of a multiple digit customer validity code into said computer for recognition, and means to permit said gate to be opened for vehicle entry after validity recognition by said computer.

* * * * *